(12) United States Patent
Kobayashi

(10) Patent No.: US 12,292,557 B2
(45) Date of Patent: May 6, 2025

(54) OPTICAL SYSTEM, IMAGE PICKUP APPARATUS, AND PROJECTION APPARATUS

(71) Applicant: CANON KABUSHIKI KAISHA, Tokyo (JP)

(72) Inventor: Kana Kobayashi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 898 days.

(21) Appl. No.: 17/473,768

(22) Filed: Sep. 13, 2021

(65) Prior Publication Data
US 2022/0099951 A1  Mar. 31, 2022

(30) Foreign Application Priority Data

Sep. 25, 2020 (JP) ................... 2020-160429

(51) Int. Cl.
G02B 17/08 (2006.01)
G02B 5/00 (2006.01)

(52) U.S. Cl.
CPC ............. *G02B 17/08* (2013.01); *G02B 5/005* (2013.01); *G02B 17/0832* (2013.01)

(58) Field of Classification Search
None
See application file for complete search history.

(56) References Cited

U.S. PATENT DOCUMENTS

| 2013/0271851 A1* | 10/2013 | Souma | G02B 3/04 359/708 |
| 2015/0146185 A1* | 5/2015 | Williamson | G03F 7/70225 359/364 |
| 2018/0180842 A1* | 6/2018 | Pretorius | G02B 13/18 |

FOREIGN PATENT DOCUMENTS

| JP | 2000100703 A | | 4/2000 | |
| JP | 2006-259660 A | | 9/2006 | |
| JP | 2007192966 A | | 8/2007 | |
| JP | 2009098600 A | * | 5/2009 | ......... A61B 1/00096 |
| JP | 2009139480 A | | 6/2009 | |
| JP | 2011-257630 A | | 12/2011 | |
| JP | 2012093760 A | | 5/2012 | |

* cited by examiner

Primary Examiner — Stephone B Allen
Assistant Examiner — Tamara Y. Washington
(74) Attorney, Agent, or Firm — Canon U.S.A., Inc. IP Division

(57) ABSTRACT

An optical system includes an entrance unit, a first reflective surface, a second reflective surface, a third reflective surface, and an exit unit. The entrance unit is rotationally symmetric around a central axis. Incident light from the entrance unit intersects the central axis and enters the first reflective surface. Reflected light from the first reflective surface enters the second reflective surface without intersecting the central axis. Reflected light from the second reflective surface enters the third reflective surface.

18 Claims, 12 Drawing Sheets

OPTICAL SYSTEM, IMAGE PICKUP APPARATUS, AND PROJECTION APPARATUS

BACKGROUND OF THE DISCLOSURE

Field of the Disclosure

The aspect of the embodiments relates to an optical system suitable for a digital video camera, a digital still camera, a broadcasting camera, a digital cinema, a projection apparatus, and the like.

Description of the Related Art

There has conventionally been known as an imaging optical system for obtaining an omnidirectional (all-round) image over 360°, a catoptric optical system that has a plurality of rotationally symmetric reflective surfaces around a central axis.

Japanese Patent Laid-Open No. ("JP") 2011-257630 discloses an optical system including a transparent medium having two reflective surfaces and two transmission surfaces that are rotationally symmetric around the central axis. In the optical system disclosed in JP 2011-257630, light incident on the transparent medium from a first transmission surface is reflected towards the side opposite to the image side by the first reflective surface, reflected towards the image side by the second reflective surface, and emitted from the transparent medium through a second transparent surface.

JP 2006-259660 discloses an optical system including a transparent medium having three reflective surfaces and two transmission surfaces that are rotationally symmetric around the central axis. In the optical system disclosed in JP 2006-259660, light incident on the transparent medium from the first transmission surface is reflected towards the image side by the first reflective surface, reflected towards the side opposite to the image side by the second reflective surface, reflected towards the image side by the third reflective surface, and emitted from the transparent medium through the second transmission surface. Such an optical path includes one side with respect to the central axis.

The recent image pickup apparatuses have been required for a compact structure and a higher image quality. It is necessary for the high-quality image to construct an optical system compatible with a large image sensor. When the optical systems disclosed in JPs 2011-257630 and 2006-259660 are used as an optical system compatible with the large image sensor, the transparent medium becomes large and the miniaturization of the optical system becomes difficult. The optical system disclosed in JP 2006-259660 needs to form a cavity near the central axis, and thus its processing is difficult.

In order to obtain the high optical performance over 360° in all directions with a compact optical system, it is necessary to properly arrange reflective surfaces that are rotationally symmetric with respect to the central axis, and to properly set the powers of the reflective surfaces, the entrance unit, and the exit unit.

SUMMARY OF THE DISCLOSURE

An optical system according to one aspect of the embodiments includes an entrance unit, a first reflective surface, a second reflective surface, a third reflective surface, and an exit unit. The entrance unit is rotationally symmetric around a central axis. Incident light from the entrance unit intersects the central axis and enters the first reflective surface. Reflected light from the first reflective surface enters the second reflective surface without intersecting the central axis. Reflected light from the second reflective surface enters the third reflective surface.

An optical system according to another aspect of the embodiments includes an entrance unit, a first reflective surface, a second reflective surface, a third reflective surface, and an exit unit. The exit unit is rotationally symmetric around a central axis. Reflected light from the first reflective surface enters the second reflective surface. Reflected light from the second reflective surface enters the third reflective surface without intersecting the central axis. Reflected light from the third reflective surface intersects the central axis and enters the exit unit.

An image pickup apparatus having the above optical system also constitutes another aspect of the embodiments.

Further features of the disclosure will become apparent from the following description of exemplary embodiments with reference to the attached drawings.

DESCRIPTION OF THE EMBODIMENTS

Figure 1:
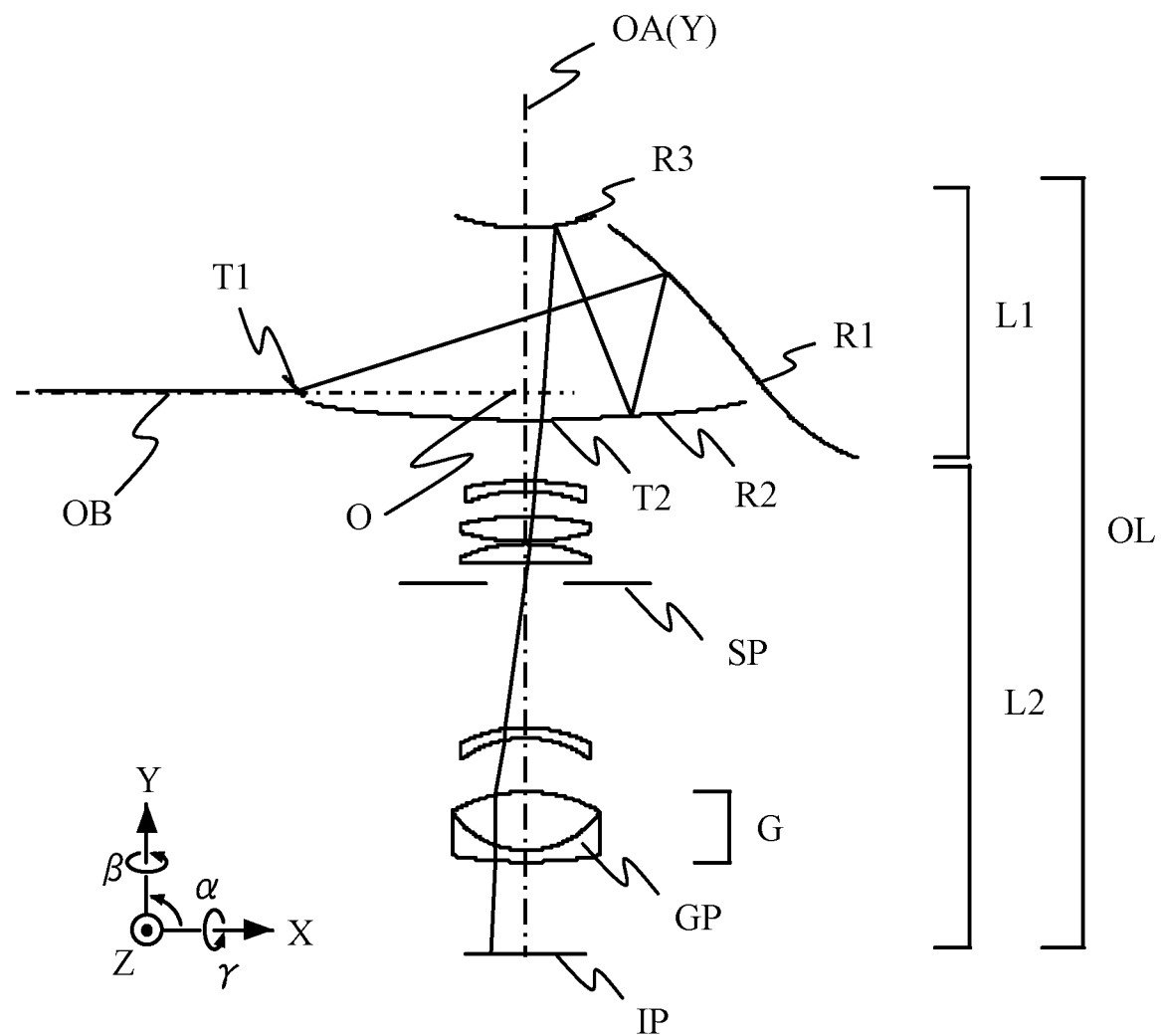
FIG. 1 explains an optical system according to one embodiment of the disclosure.

Referring now to the accompanying drawings, a detailed description will be given of embodiments according to the disclosure. Corresponding elements in respective figures will be designated by the same reference numerals, and a duplicate description thereof will be omitted.

FIG. 1 explains an optical system OL according to one embodiment of the disclosure. The optical system OL according to each example is an optical system used for an image pickup apparatus, such as a digital video camera, a digital still camera, a broadcasting camera, a film-based camera, and a surveillance camera. The optical system OL according to each example can also be used for a projection optical system for a projection apparatus (projector). That is, the optical system OL forms an omnidirectional image having an angle of view of 360° on an image plane IP, or projects an omnidirectional image disposed on the image plane IP on an angle of view of 360°.

In this embodiment, a Y-axis direction is set to a direction of a central axis OA of the optical system OL, and the paper plane of FIG. 1 is set to an X-Y plane. In FIG. 1, the negative side in the X-axis direction is an enlargement side (object side), and a negative side in the Y-axis direction is a reduction side (image side). In the optical system OL that forms an image on an image sensor such as CMOS with an aspect ratio, for example, an X axis is set to an axis orthogonal to the central axis OA and parallel to a long side direction of the image plane IP, and a Z axis is set to an axis orthogonal to the central axis OA and parallel to the short side direction of the image plane IP. When the image plane IP is square, the X and Z axes can be arbitrarily set so that they are orthogonal to each other on the image plane IP. An origin O of the optical system OL is set to a point at which an extended principal ray (reference axis ray) OB of light that enters an entrance unit T1 parallel to the X axis (at a vertical angle of view of 0° on the X-Y section) perpendicularly intersects the central axis OA. In this embodiment, the principal ray OB has a wavelength of 587.56 nm.

SP denotes a diaphragm (aperture stop) that determines (limits) a light beam of the open F-number (Fno). The diaphragm SP can prevent flare light from entering the Z-X section, and improve the image quality. Disposed on the image plane IP is an imaging plane of a solid-state image sensor (photoelectric conversion element), such as a CCD sensor or a CMOS sensor, that receives an image formed by an imaging optical system when the optical system according to each example is used as an imaging optical system for a digital still camera or a digital video camera. When the optical system according to each example is used as an imaging optical system of the film-based camera, a photosensitive plane corresponding to the film plane is placed on the image surface IP.

The optical system OL according to each example has a front unit L1 that includes an entrance unit T1, a first reflective surface R1, a second reflective surface R2, a third reflective surface R3, and an exit unit T2. The front unit L1 is formed by a transparent medium using a glass material or a resin material, or a shell body that defines a predetermined internal space (hollow or cavity). The entrance unit T1 is rotationally symmetric around the central axis OA. The first to third reflective surfaces and the exit unit may be rotationally symmetric around the central axis OA (annular with respect to the central axis OA). The incident light from the entrance unit T1 intersects the central axis OA and enters the first reflective surface RE The reflected light from the first reflective surface R1 enters the second reflective surface R2 without intersecting the central axis OA. The reflected light from the second reflective surface R2 enters the third reflective surface R3.

Since the optical system OL according to each example has three reflective surfaces and more frequently bends the light beam, the front unit L1 can be more easily made compact than the optical system having two reflective surfaces. In addition, since the power of the reflective surface can be dispersed, the image quality can be easily improved.

Since the incident light from the entrance unit T1 intersects the central axis OA and enters the first reflective surface R1, a distance from the entrance unit T1 to the first reflective surface R1 can be shortened, and the optical system OL can be easily made compact. When the reflected light from the first reflective surface R1 enters the second reflective surface R2 without intersecting the central axis OA, the slope of the first reflective surface R1 relative to the central axis OA can be secured and the first reflective surface R1 can be easily processed.

As described above, by properly setting the entrance unit T1, the plurality of reflective surfaces, the exit unit T2, and the optical path of the light beam, the optical system OL can be made compact and can secure a high optical performance over 360° in all directions.

In the optical system OL according to each example, the second reflective surface R2 may be disposed on the image side of the first reflective surface R1 in the X-Y section. This configuration facilitates the miniaturization of the front unit L1 while avoiding interferences among the effective diameters of the surfaces.

In the optical system OL according to each example, the second reflective surface R2 may be disposed on the image side of the third reflective surface R3 in the X-Y section. Thereby, the front unit L1 can be made compact while the aberration generated in the front unit L1 can be suppressed.

In the optical system OL according to each example, the reflected light from the second reflective surface R2 may enter the third reflective surface R3 without intersecting the central axis OA in the X-Y section. Thereby, the optical path length can be shortened and a light amount can be secured.

In the optical system OL according to each example, the incident light from the entrance unit T1 may be sequentially reflected by the reflective surfaces disposed on the axially symmetric side of the entrance unit T1 with respect to the central axis OA. Thereby, the front unit L1 can be made compact while interferences among the effective diameters of the surfaces can be suppressed.

The optical system OL according to each example may satisfy the following inequality (1):

$$0.20 < B/A < 0.80 \tag{1}$$

where A is a distance by which the principal ray OB travels from the entrance unit T1 to the first reflective surface R1, and B is a distance by which the principal ray OB travels from the first reflective surface R1 to the second reflective surface R2.

The inequality (1) defines a ratio of the distance A by which the principal ray OB travels from the entrance unit T1 to the first reflective surface R1 to the distance B by which the principal ray OB travels from the first reflective surface R1 to the second reflective surface R2. As described above, the principal ray OB is a principal ray of light that enters the entrance unit T1 in parallel with the X axis (at a vertical angle of view of 0° on the X-Y section). If the distance A becomes longer beyond the lower limit in the inequality (1), the front unit L1 becomes larger. If the distance A becomes shorter beyond the upper limit in the inequality (1), the power in the Z-X direction becomes too strong and it becomes difficult to correct the astigmatism.

The numerical range of the inequality (1) may be set to that of the following inequality (1a):

$$0.23 < B/A < 0.50 \tag{1a}$$

Satisfying the inequality (1a) makes proper the ratio of the distance A to the distance B, and facilitates the miniaturization of the optical system OL.

The numerical range of the inequality (1) may be set to that of the following inequality (1b):

$$0.25 < B/A < 0.45 \tag{1b}$$

In the optical system OL according to each example, the incident light from the entrance unit T1 intersects the central axis OA twice before reaching the image plane. This configuration facilitates the miniaturization of the optical system OL.

The optical system OL according to each example may satisfy the following conditional expression (2):

$$1.05<|f_{x-y}/f_{z-x}|<10.00 \tag{2}$$

where $f_{x-y}$ is a focal length of the optical system OL in the X-Y section, and $f_{z-x}$ is a focal length of the optical system OL in the Z-X section.

The inequality (2) defines a ratio of the focal length $f_{x-y}$ of the optical system OL in the X-Y section to the focal length $f_{z-x}$ of the optical system OL in the Z-X section. If the ratio of the focal length $f_{x-y}$ of the optical system OL in the X-Y section to the focal length $f_{z-x}$ of the optical system OL in the Z-X section becomes large beyond the upper limit in the inequality (2), it becomes difficult to correct the astigmatism and curvature of field. When the ratio of the focal length $f_{x-y}$ of the optical system OL in the X-Y section to the focal length $f_{z-x}$ of the optical system OL in the Z-X section becomes small beyond the lower limit in the inequality (2), the optical system OL becomes larger. Here, the focal lengths $f_{x-y}$ and $f_{z-x}$ are defined with the d-line (wavelength 587.56 nm).

The numerical range of the inequality (2) may be set to that of the following inequality (2a):

$$1.10<|f_{x-y}/f_{z-x}|<3.00 \tag{2a}$$

Satisfying the inequality (2a) can make proper the ratio of the focal length $f_{x-y}$ of the optical system OL in the X-Y section to the focal length of the optical system OL in the Z-X section, and facilitates the miniaturization of the optical system OL and corrections of the curvature of field and astigmatism.

The numerical range of the inequality (2) may be set to that of the following inequality (2b):

$$1.20<|f_{x-y}/f_{z-x}|<2.50 \tag{2b}$$

The optical system OL according to each example may include a rear unit L2 as a dioptric optical system disposed on the image side of the exit unit T2. The astigmatism generated in the rear unit L2 so as to cancel the astigmatism generated in the front unit L1 can facilitate the suppression of the astigmatism in the optical system OL.

In the optical system OL according to each example, the rear unit L2 may include the cemented lens G on the image side of the diaphragm SP. Disposing the cemented lens G on the image side of the diaphragm SP can facilitate corrections of the aberrations of the off-axis rays. In particular, this configuration can facilitate the suppressions of the chromatic aberration generated in the rear unit L2 and the astigmatism generated in the front unit L1.

The optical system OL according to each example may satisfy the following inequality (3):

$$-0.90<(RP2+RP1)/(RP2-RP1)<0.00 \tag{3}$$

where RP1 is a radius of curvature on the object side of the positive lens Gp included in the cemented lens G, and RP2 is a radius of curvature on the image side of the positive lens Gp.

The inequality (3) defines a shape (shape factor) of the positive lens Gp. If the value is higher than the upper limit in the inequality (3), the astigmatism and curvature of field increase, and the astigmatism and curvature of field generated in the front unit L1 are overcorrected. If the value is lower than the lower limit in the inequality (3), the astigmatism and curvature of field generated in the front unit L1 is to be corrected in the rear unit L2, the number of lenses in the rear unit L2 increases, and the optical system OL becomes larger.

The numerical range of the inequality (3) may be set to that of the following inequality (3a):

$$-0.50<(RP2+RP1)/(RP2-RP1)<-0.02 \tag{3a}$$

By satisfying the inequality (3a), the curved surface on the image side has a smaller radius of curvature than that of the curved surface on the object side, and facilitates corrections of the curvature of field and astigmatism.

The numerical range of the inequality (3) may be set to that of the following inequality (3b):

$$-0.30<(RP2+RP1)/(RP2-RP1)<-0.05 \tag{3b}$$

In the optical system OL according to each example, the rear unit L2 may include, on the image side of the diaphragm SP, at least one single lens having a negative refractive power with a concave surface facing the image side. This configuration enables the optical paths of the light rays at vertical angles of view to be separated, and facilitates corrections of the aberrations over the entire vertical angle of view.

Figure 2A:
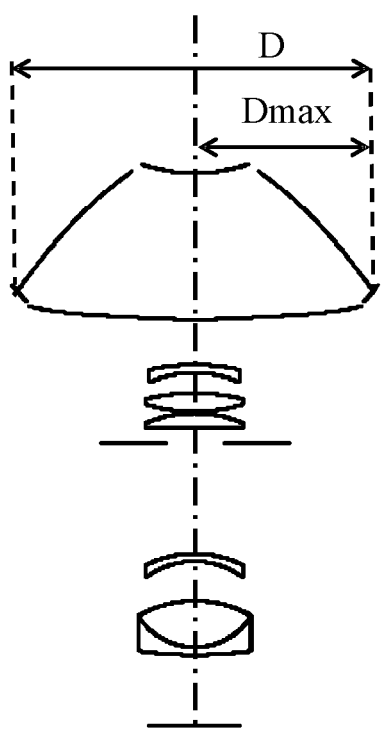
FIGS. 2A and 2B explain the maximum diameter of the optical system.
Figure 2B:
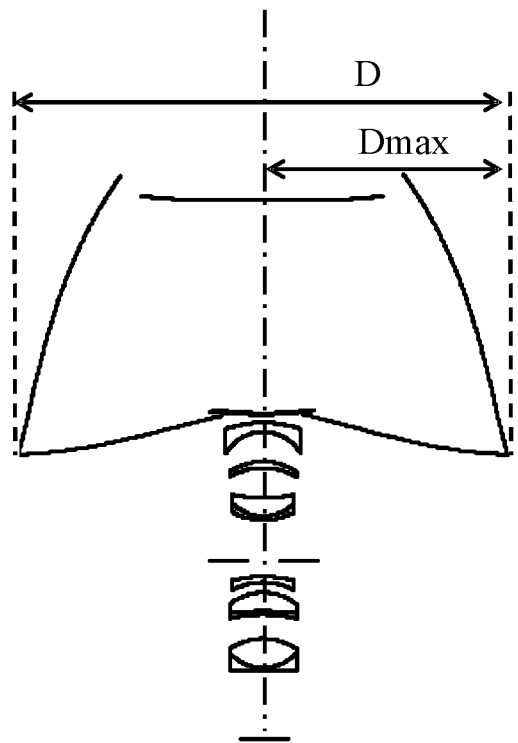

The optical system OL according to each example may satisfy the following inequality (4):

$$0.1<D/Dr<12.0 \tag{4}$$

where D is the maximum diameter of the optical system OL (outer diameter of the front unit L1), and Dr is a diameter of the image circle. FIGS. 2A and 2B explain the maximum diameter D of the optical system OL. Where Dmax is the maximum value of the X-axis coordinates, the maximum diameter D is expressed as 2×Dmax.

The inequality (4) defines a ratio of the maximum diameter D of the optical system OL to the diameter Dr of the image circle. If the value is higher than the upper limit in the inequality (4), the front unit L1 becomes larger. If the value is lower than the lower limit in the inequality (4), the power in the Z-X direction becomes too strong and it becomes difficult to correct the astigmatism.

The numerical range of the inequality (4) may be set to that of the following inequality (4a):

$$2.0<D/Dr<10.0 \tag{4a}$$

Satisfying the inequality (4a) makes proper the ratio of the maximum diameter D of the optical system OL to the diameter Dr of the image circle, and facilitates the miniaturization of the optical system OL while correcting the astigmatism.

The numerical range of the inequality (4) may be set to that of the following inequality (4b).

$$3.5<D/Dr<9.5 \tag{4b}$$

In the optical system OL according to each example, the light incident on the entrance unit T1 is imaged in an annular shape at a position deviated from the central axis OA of the image plane IP. This configuration enables omnidirectional imaging over 360° with a single image sensor.

In the optical system OL according to each example, at least one of the entrance unit T1, the plurality of reflective surfaces, and the exit unit T2 may have a free curved surface formed by rotating a line segment containing an odd-order term around the central axis OA. Thereby, the eccentric aberration can be corrected to provide the optical system OL with a high resolving power, and the optical system OL can be easily made smaller.

In the optical system OL according to each example, the entrance unit T1, the plurality of reflective surfaces, and the exit unit T2 may be rotationally symmetric around the central axis OA and may be provided in the transparent medium L having a refractive index larger than 1. Thereby, the relative eccentricity of the reflective surface can be suppressed, and it becomes easy to suppress manufacturing errors.

In the optical system OL according to each example, the entrance unit T1, the plurality of reflective surfaces, and the exit unit T2 may be provided in the shell body L that defines a predetermined internal space (having a cavity inside). The hollow shell L can reduce the weight and cost in comparison with the shell L made of a glass material or a resin material.

In the optical system OL according to each example, the entrance unit T1 may have a refractive power. Thereby, the distance A can be reduced by which the principal ray OB travels from the entrance unit T1 to the first reflective surface R1, and the front unit L1 can be made smaller.

In the optical system OL according to each example, the exit unit T2 may have a refractive power. Thereby, the incident angle of the light incident on the rear unit L2 can be suppressed, and the aberration correction in the optical system OL becomes easier.

Example 1

Figure 3:
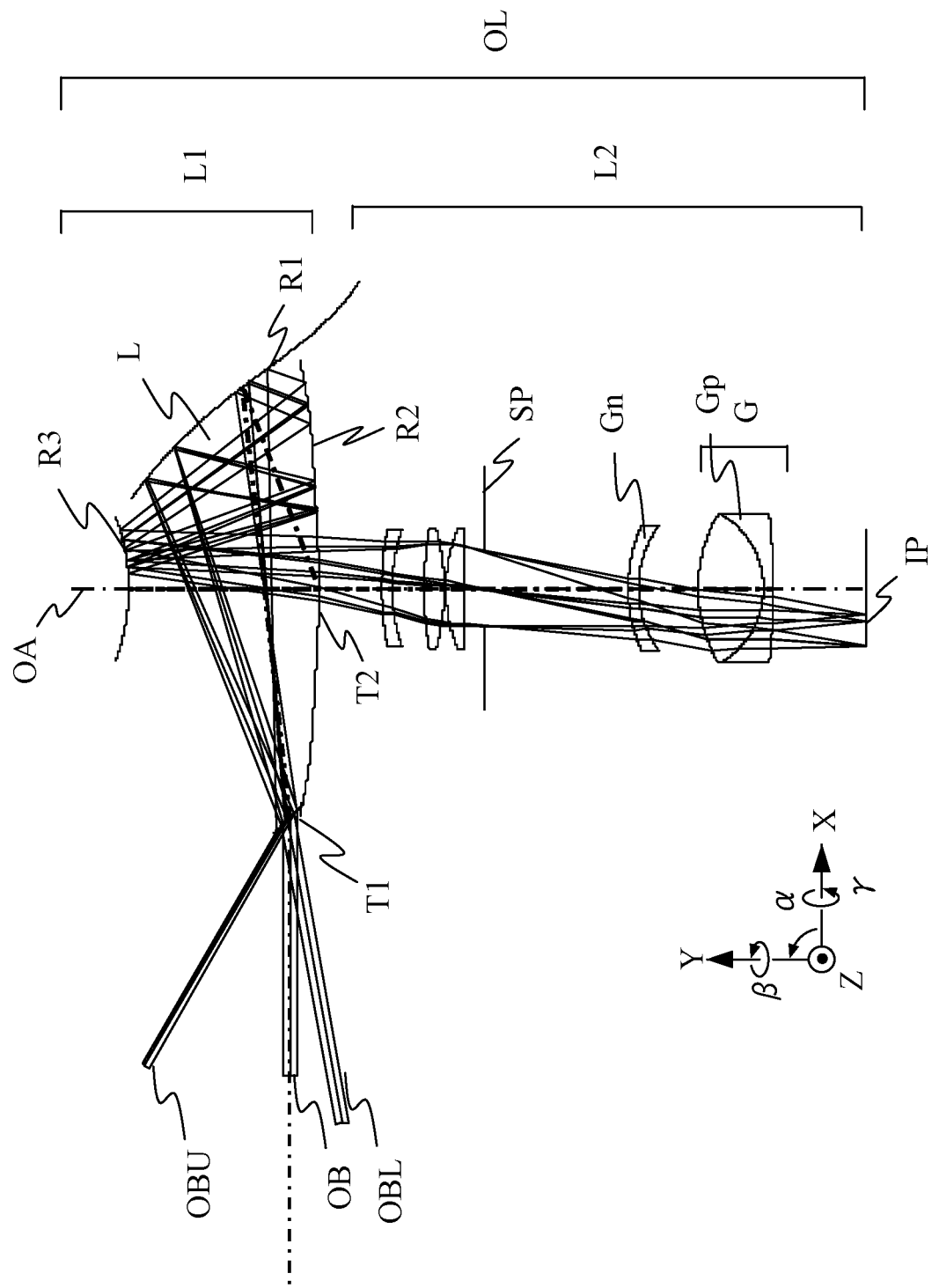
FIG. 3 is a sectional view taken along a line X-Y when the optical system according to Example 1 is in-focus at infinity.
Figure 4:
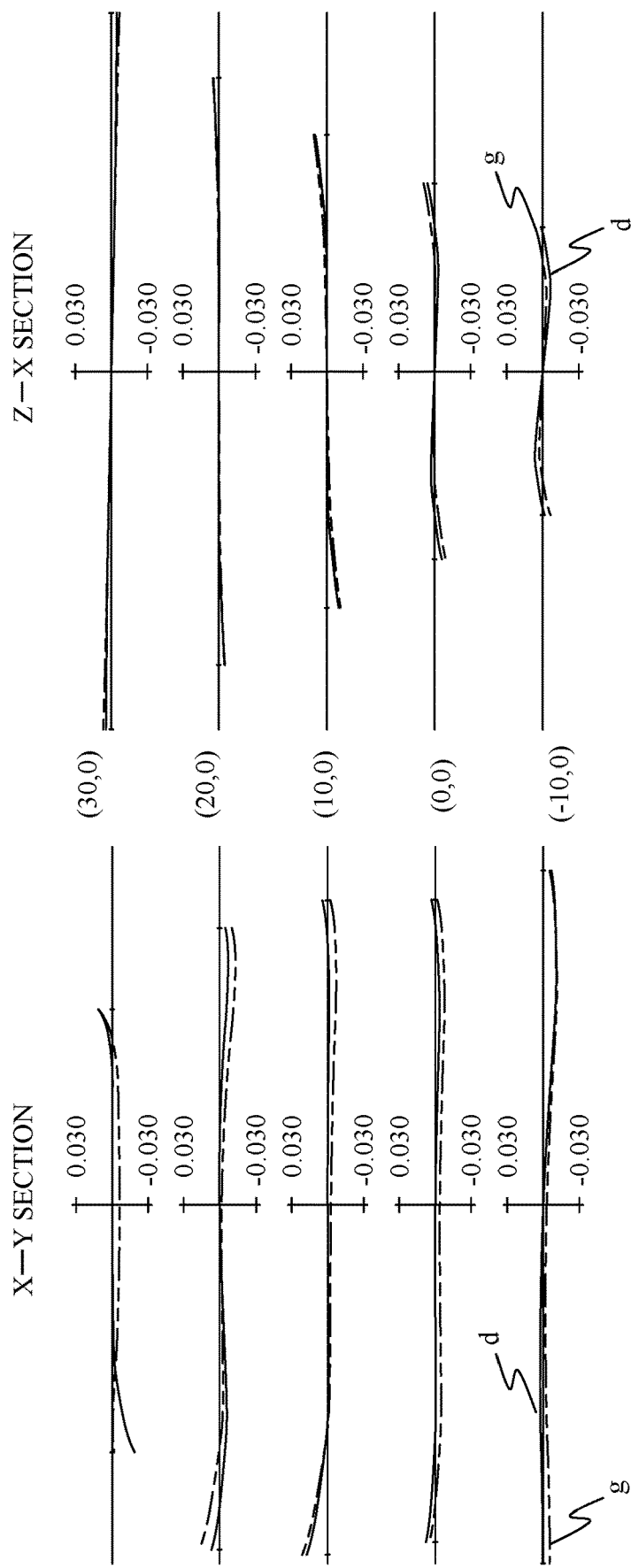
FIG. 4 is a lateral aberration diagram of the optical system according to Example 1 that is in-focus at infinity.

FIG. 3 is a sectional view taken along the line X-Y when the optical system OL according to this example is in-focus at infinity. FIG. 4 is a lateral aberration diagram of the optical system OL according to this example that is in-focus at infinity. In the lateral aberration diagram, central numerical values shown indicate an angle of the incident light ray on the entrance unit T1 in the X-Y section and an angle of the incident light ray on the entrance unit T1 in the Z-X section. The angle of the light ray incident on the entrance unit T1 in the X-Y section is an angle formed between the light ray incident on the entrance unit T1 in the X-Y section and the X axis. The angle of the light ray incident on the entrance unit T1 in the Z-X section is an angle formed between the light ray incident on the entrance unit T1 in the Z-X section and the X axis. Left and right graphs illustrate lateral aberrations at the angle of the incident light ray. A solid line illustrates the lateral aberration for the d-line (wavelength 587.56 nm), and a dotted line illustrates the lateral aberration for the g-line (wavelength 435.8 nm).

The optical system OL includes, in order from the enlargement side to the reduction side, a front unit L1 and a rear unit L2, each of which is rotationally symmetric with respect to the central axis OA. The front unit L1 is rotationally symmetric around the central axis OA and includes a transparent medium L with a refractive index larger than 1. The transparent medium L includes, in order from the enlargement side to the reduction side, the entrance unit T1, the first reflective surface R1, the second reflective surface R2, the third reflective surface R3, and the exit unit T2. Each of the entrance unit T1 and the first reflective surface R1 has a free-form surface with the central axis OA as a reference axis. Each of the second reflective surface R2, the third reflective surface R3, and the exit unit T2 has an aspherical surface with the central axis OA as a reference axis. Each of the entrance unit T1 and the exit unit T2 has a refractive surface. The rear unit L2 has a diaphragm SP coaxial with the central axis OA. The rear unit L2 includes, on the image side of the diaphragm SP, a negative lens Gn having a concave surface facing the image side, and a cemented lens G including a positive lens Gp and a negative lens.

The incident light from the entrance unit T1 intersects the central axis OA and enters the first reflective surface RE The reflected light from the first reflective surface R1 enters the second reflective surface R2 without intersecting the central axis OA. The reflected light from the second reflective surface R2 enters the third reflective surface R3 without intersecting the central axis OA. The reflected light from the third reflective surface R3 is emitted from the exit unit T2.

The first reflective surface R1 is disposed on the image side of the third reflective surface R3. The second reflective surface R2 is disposed on the image side of the first reflective surface RE The entrance unit T1 is disposed between the first reflective surface R1 and the third reflective surface R3 in the X-Y section.

The light emitted from the exit unit T2 passes through the rear unit L2 and is imaged in an annular shape at a position deviated from the central axis OA of the image plane IP.

A light ray OBU incident on the entrance unit T1 from the side opposite to the image side of the principal ray OB is imaged outside a position where the principal ray OB is imaged on the image plane IP. A light ray OBL incident on the entrance unit T1 from the image side of the principal ray OB is imaged inside the position where the principal ray OB is imaged on the image plane IP.

In the X-Y section, the incident light from the entrance unit T1 forms an intermediate image once before reaching the second reflective surface R2.

Example 2

Figure 5:
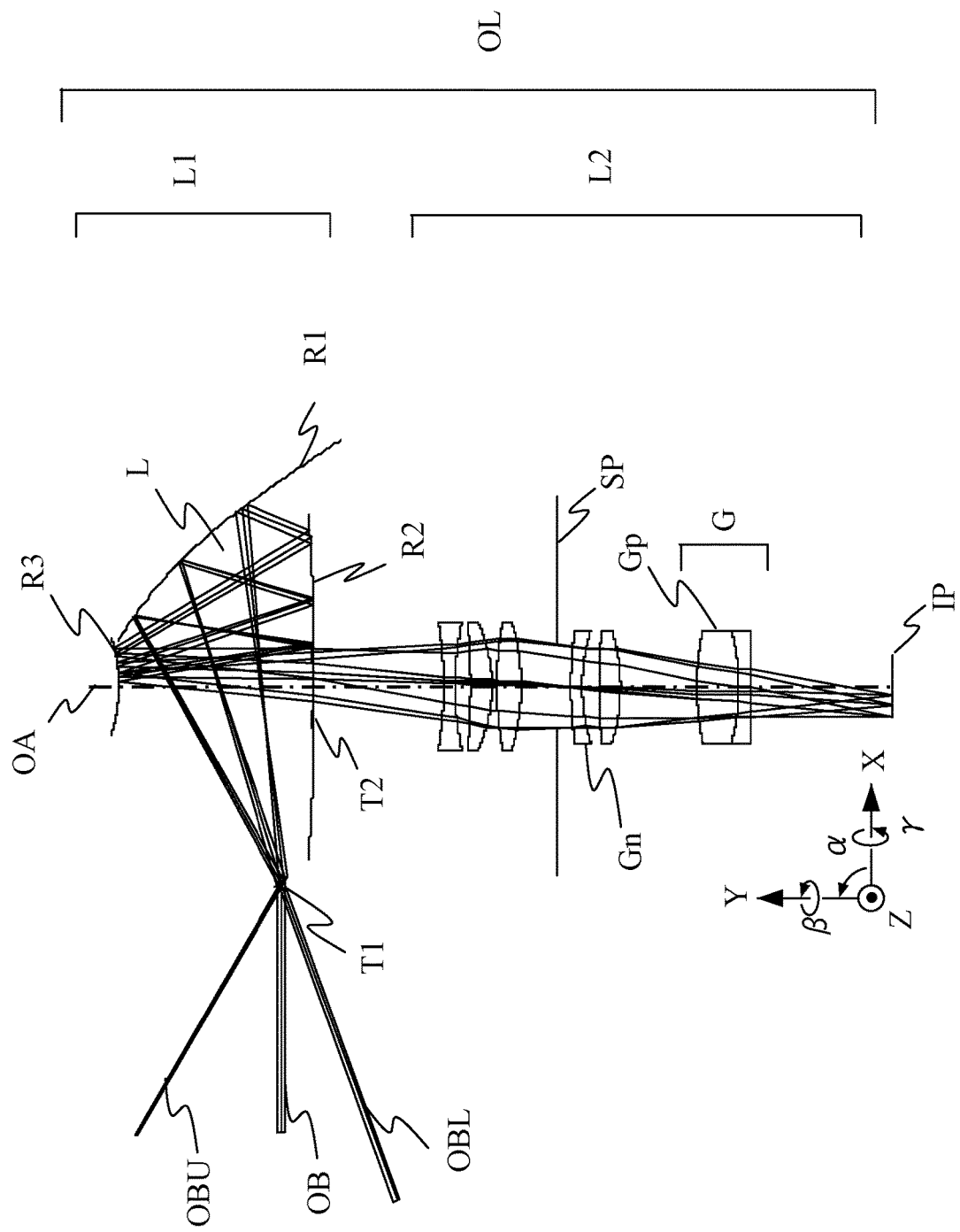
FIG. 5 is a sectional view taken along a line X-Y when an optical system according to Example 2 is in-focus at infinity.
Figure 6:
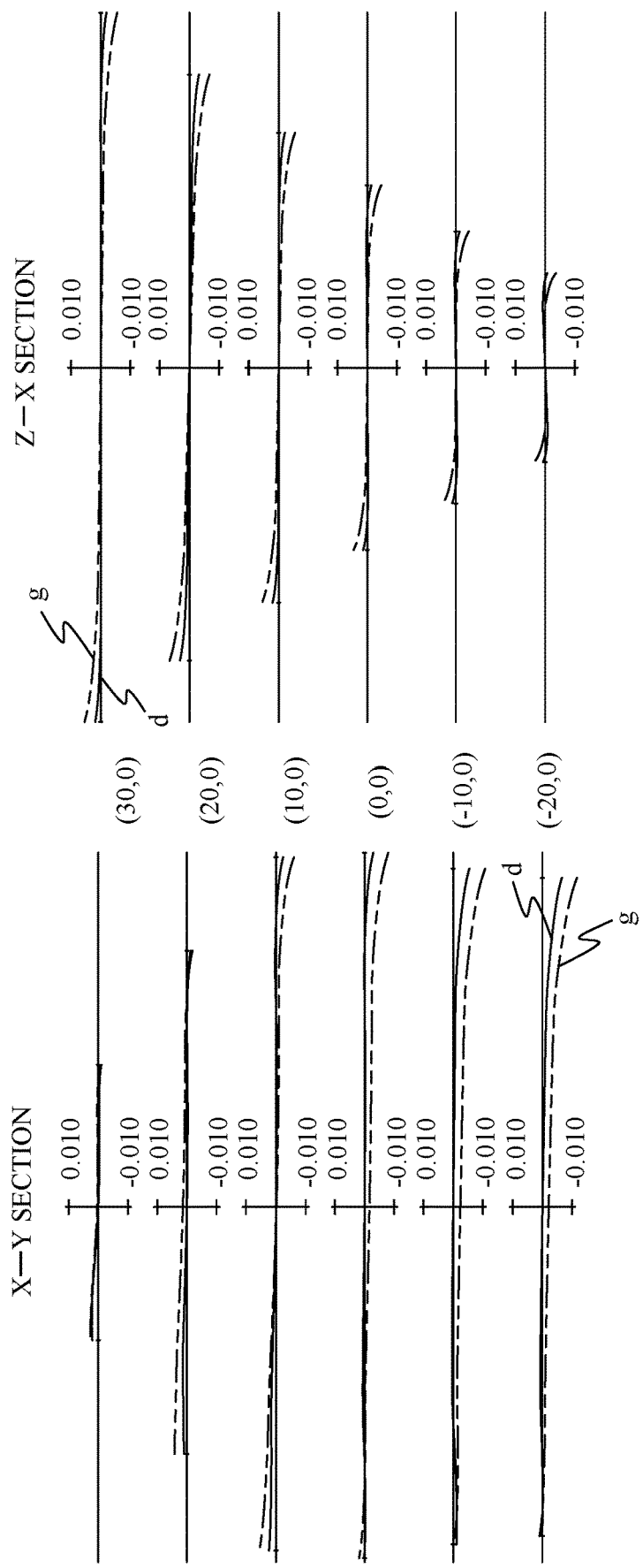
FIG. 6 is a lateral aberration diagram of the optical system according to Example 2 that is in-focus at infinity.

FIG. 5 is a sectional view taken along the line X-Y when the optical system OL according to this example is in-focus at infinity. FIG. 6 is a lateral aberration diagram of the optical system OL according to this example that is in-focus at infinity. In the lateral aberration diagram, central numerical values indicate an angle of the incident light ray on the entrance unit T1 in the X-Y section and an angle of the incident light ray on the entrance unit T1 in the Z-X section. The angle of the light ray incident on the entrance unit T1 in the X-Y section is an angle formed between the light ray incident on the entrance unit T1 in the X-Y section and the X axis. The angle of the light ray incident on the entrance unit T1 in the Z-X section is an angle formed between the light ray incident on the entrance unit T1 in the Z-X section and the X axis. Left and right graphs illustrate lateral aberrations at the angle of the incident ray. A solid line illustrates the lateral aberration for the d-line (wavelength 587.56 nm), and a dotted line illustrates the lateral aberration for the g-line (wavelength 435.8 nm).

The optical system OL includes, in order from the enlargement side to the reduction side, a front unit L1 and a rear unit L2, each of which is rotationally symmetric with respect to the central axis OA. The front unit L1 is rotationally symmetric around the central axis OA and includes a transparent medium L with a refractive index larger than 1. The transparent medium L includes, in order from the enlargement side to the reduction side, the entrance unit T1, the first reflective surface R1, the second reflective surface R2, the third reflective surface R3, and the exit unit T2. Each of the entrance unit T1 and the first reflective surface R1 has a free-form surface with the central axis OA as a reference axis. Each of the second reflective surface R2, the third reflective surface R3, and the exit unit T2 has an aspherical surface with the central axis OA as a reference axis. Each of the entrance unit T1 and the exit unit T2 has a refractive surface. The rear unit L2 has a diaphragm SP coaxial with the central axis OA. The rear unit L2 includes, on the image side of the diaphragm SP, a negative lens Gn having a concave surface facing the image side, and a cemented lens G including a positive lens Gp and a negative lens.

The incident light from the entrance unit T1 intersects the central axis OA and enters the first reflective surface RE The reflected light from the first reflective surface R1 enters the second reflective surface R2 without intersecting the central axis OA. The reflected light from the second reflective surface R2 enters the third reflective surface R3 without intersecting the central axis OA. The reflected light from the third reflective surface R3 is emitted from the exit unit T2.

The first reflective surface R1 is disposed on the image side of the third reflective surface R3. The second reflective surface R2 is disposed on the image side of the first reflective surface RE The entrance unit T1 is disposed between the first reflective surface R1 and the third reflective surface R3 in the X-Y section.

The light emitted from the exit unit T2 passes through the rear unit L2 and is imaged in an annular shape at a position deviated from the central axis OA of the image plane IP.

A light ray OBU incident on the entrance unit T1 from the side opposite to the image side of the principal ray OB is imaged outside a position where the principal ray OB is imaged on the image plane IP. A light ray OBL incident on the entrance unit T1 from the image side of the principal ray OB is imaged inside the position where the principal ray OB is imaged on the image plane IP.

In the X-Y section, the incident light from the entrance unit T1 is intermediately imaged once before reaching the second reflective surface R2.

Example 3

Figure 7:
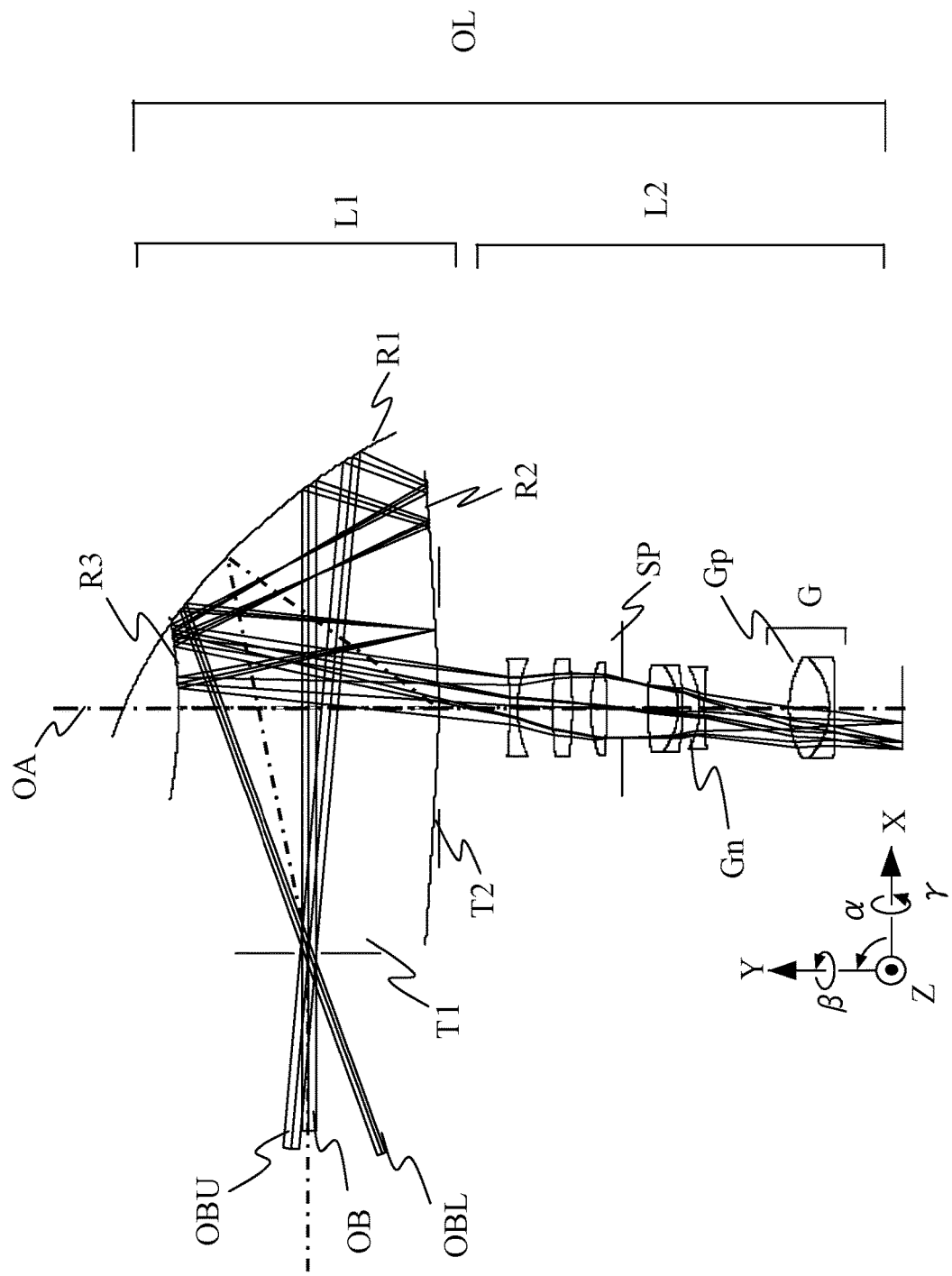
FIG. 7 is a sectional view taken along a line X-Y when the optical system according to Example 3 is in-focus at infinity.
Figure 8:
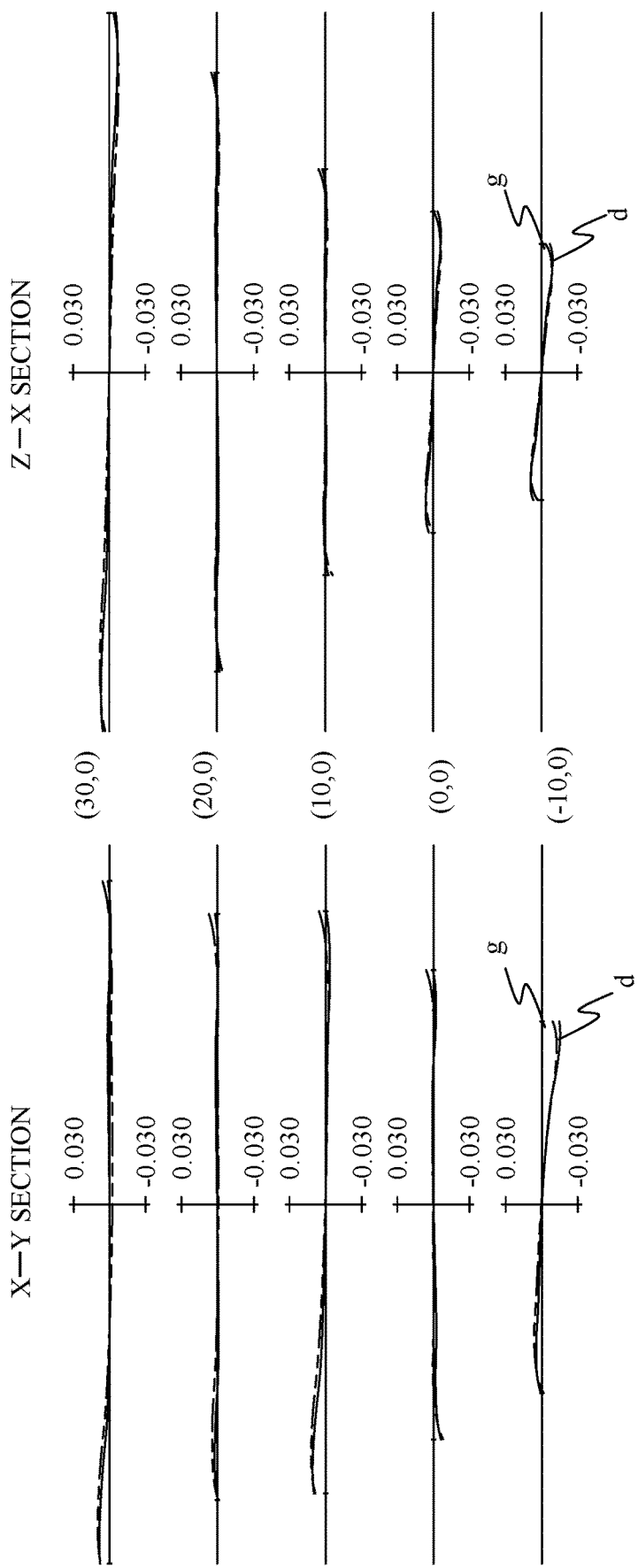
FIG. 8 is a lateral aberration diagram of the optical system according to Example 3 that is in-focus at infinity.

FIG. 7 is a sectional view taken along the line X-Y when the optical system OL according to this example is in-focus at infinity. FIG. 8 is a lateral aberration diagram of the optical system OL according to this example that is in-focus at infinity. In the lateral aberration diagram, central numerical values indicate an angle of the incident light ray on the entrance unit T1 in the X-Y section and an angle of the incident light ray on the entrance unit T1 in the Z-X section. The angle of the light ray incident on the entrance unit T1 in the X-Y section is an angle formed between the light ray incident on the entrance unit T1 in the X-Y section and the X axis. The angle of the light ray incident on the entrance unit T1 in the Z-X section is an angle formed between the light ray incident on the entrance unit T1 in the Z-X section and the X axis. Left and right graphs illustrate the lateral aberration at the angle of the incident ray. A solid line illustrates the lateral aberration for the d-line (wavelength 587.56 nm), and a dotted line illustrates the lateral aberration for the g-line (wavelength 435.8 nm).

The optical system OL includes, in order from the enlargement side to the reduction side, a front unit L1 and a rear unit L2, each of which is rotationally symmetric with respect to the central axis OA. The front unit L1 includes a shell body that defines a predetermined internal space, and has the entrance unit T1, the first reflective surface R1, the second reflective surface R2, the third reflective surface R3, and the exit unit T2. The first reflective surface R1 is a free-form surface with the central axis OA as a reference axis. The exit unit T2 and the second reflective surface R2 have the same Y-coordinate values. The rear unit L2 has a diaphragm SP coaxial with the central axis OA. The rear unit L2 includes, on the image side of the diaphragm SP, a negative lens Gn having a concave surface facing the image side, and a cemented lens G including a positive lens Gp and a negative lens.

The incident light from the entrance unit T1 intersects the central axis OA and enters the first reflective surface RE The reflected light from the first reflective surface R1 enters the second reflective surface R2 without intersecting the central axis OA. The reflected light from the second reflective surface R2 enters the third reflective surface R3 without intersecting the central axis OA. The reflected light from the third reflective surface R3 is emitted from the exit unit T2.

The first reflective surface R1 is disposed on the image side of the third reflective surface R3. The second reflective surface R2 is disposed on the image side of the first reflective surface RE The entrance unit T1 is disposed between the first reflective surface R1 and the third reflective surface R3 in the X-Y section.

The light emitted from the exit unit T2 passes through the rear unit L2 and is imaged in an annular shape at a position deviated from the central axis OA of the image plane IP.

A light ray OBU incident on the entrance unit T1 from the side opposite to the image side of the principal ray OB is imaged outside a position where the principal ray OB is imaged on the image plane IP. A light ray OBL incident on the entrance unit T1 from the image side of the principal ray OB is imaged inside the position where the principal ray OB is imaged on the image plane IP.

In the X-Y section, the incident light from the entrance unit T1 is reflected by the second reflective surface R2, and forms an intermediate image once before reaching the third reflective surface R3.

Example 4

Figure 9:
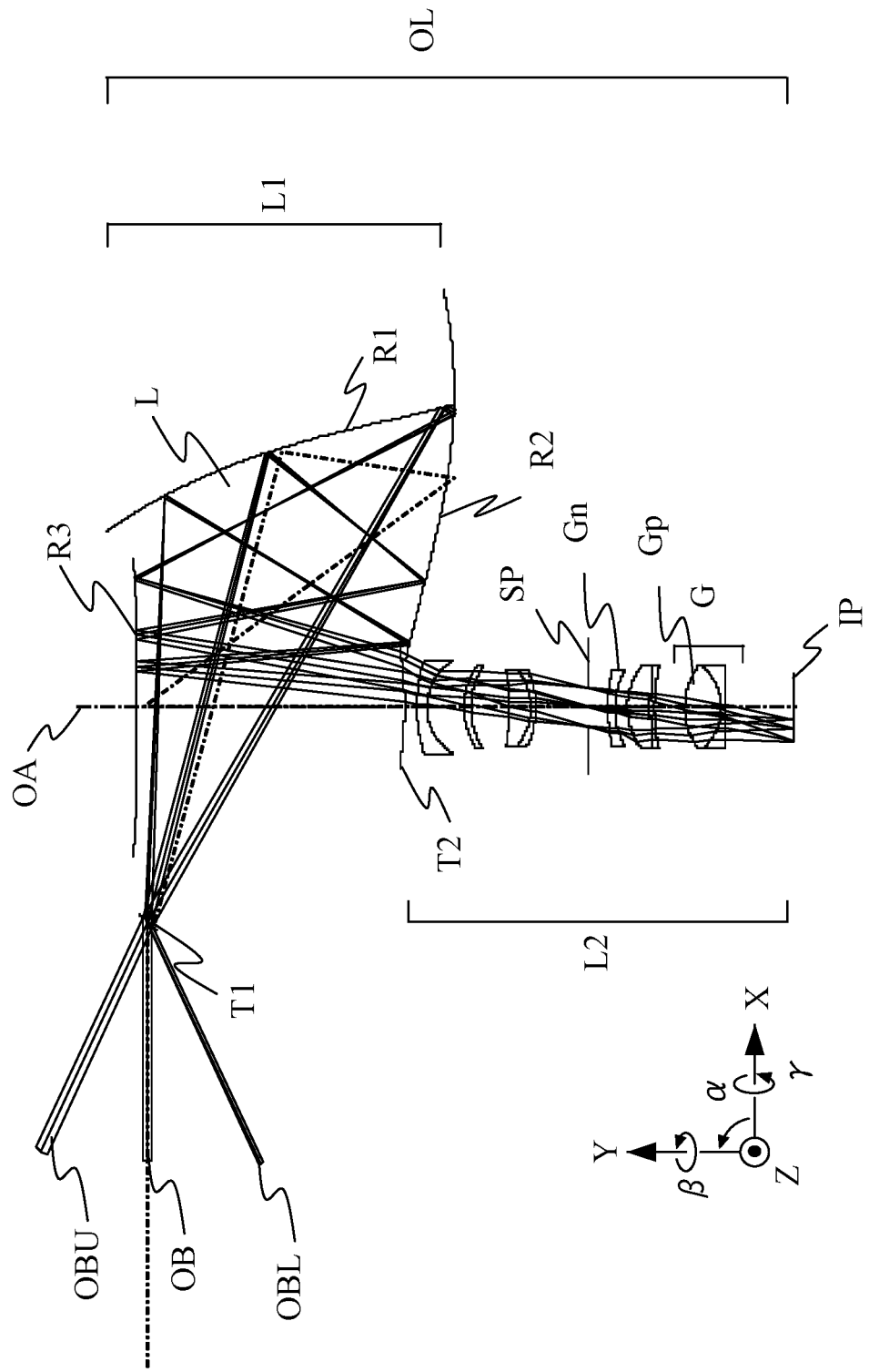
FIG. 9 is a sectional view taken along a line X-Y when an optical system according to Example 4 is in-focus at infinity.
Figure 10:
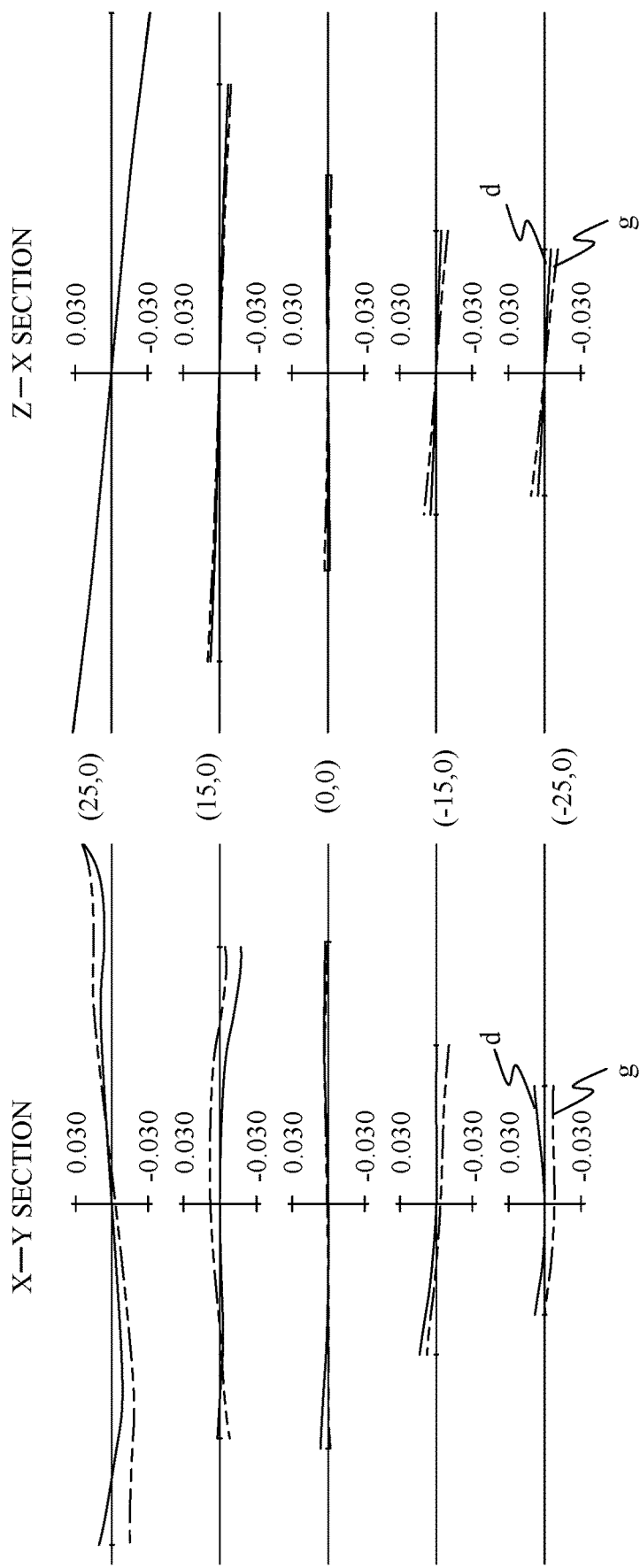
FIG. 10 is a lateral aberration diagram of the optical system according to Example 4 that is in-focus at infinity.

FIG. 9 is a sectional view taken along the line X-Y when the optical system OL according to this example is in-focus at infinity. FIG. 10 is a lateral aberration diagram of the optical system OL according to this example that is in-focus at infinity. In the lateral aberration diagram, central numerical values indicate an angle of the incident light ray on the entrance unit T1 in the X-Y section and an angle of the incident light ray on the entrance unit T1 in the Z-X section. The angle of the light ray incident on the entrance unit T1 in the X-Y section is an angle formed between the light ray incident on the entrance unit T1 in the X-Y section and the X axis. The angle of the light ray incident on the entrance unit T1 in the Z-X section is an angle formed between the light ray incident on the entrance unit T1 in the Z-X section and the X axis. Left and right graphs illustrate the lateral aberration at the angle of the incident ray. A solid line illustrates the lateral aberration for the d-line (wavelength 587.56 nm), and a dotted line illustrates the lateral aberration for the g-line (wavelength 435.8 nm).

The optical system OL includes, in order from the enlargement side to the reduction side, a front unit L1 and a rear unit L2, each of which is rotationally symmetric with respect to the central axis OA. The front unit L1 is rotationally symmetric about the central axis OA and includes a transparent medium L with a refractive index larger than 1. The transparent medium L includes, in order from the enlargement side to the reduction side, the entrance unit T1, the first reflective surface R1, the second reflective surface R2, the third reflective surface R3, and the exit unit T2. Each of the entrance unit T1, the first reflective surface R1, the second reflective surface R2, the third reflective surface R3, and the exit unit T2 has a free-form surface with the central axis OA as a reference axis. Each of the entrance unit T1 and the exit unit T2 has a refractive surface. The rear unit L2 has a diaphragm SP coaxial with the central axis OA. The rear unit L2 includes, on the image side of the diaphragm SP, a negative lens Gn having a concave surface facing the image side, and a cemented lens G including a positive lens Gp and a negative lens.

The incident light from the entrance unit T1 intersects the central axis OA and enters the first reflective surface RE The reflected light from the first reflective surface R1 enters the second reflective surface R2 without intersecting the central axis OA. The reflected light from the second reflective surface R2 enters the third reflective surface R3 without intersecting the central axis OA. The reflected light from the third reflective surface R3 is emitted from the exit unit T2.

The first reflective surface R1 is disposed on the image side of the third reflective surface R3. The second reflective surface R2 is disposed on the image side of the first reflective surface RE The entrance unit T1 is disposed between the first reflective surface R1 and the third reflective surface R3 in the X-Y section.

The light emitted from the exit unit T2 passes through the rear unit L2 and is imaged in an annular shape at a position deviated from the central axis OA of the image plane IP.

A light ray OBU incident on the entrance unit T1 from the side opposite to the image side of the principal ray OB is imaged outside a position where the principal ray OB is imaged on the image plane IP. A light ray OBL incident on the entrance unit T1 from the image side of the principal ray OB is imaged inside the position where the principal ray OB is imaged on the image plane IP.

In the X-Y section, the incident light from the entrance unit T1 is reflected by the first reflective surface R1 and forms an intermediate image once before reaching the second reflective surface R2.

Example 5

Figure 11:
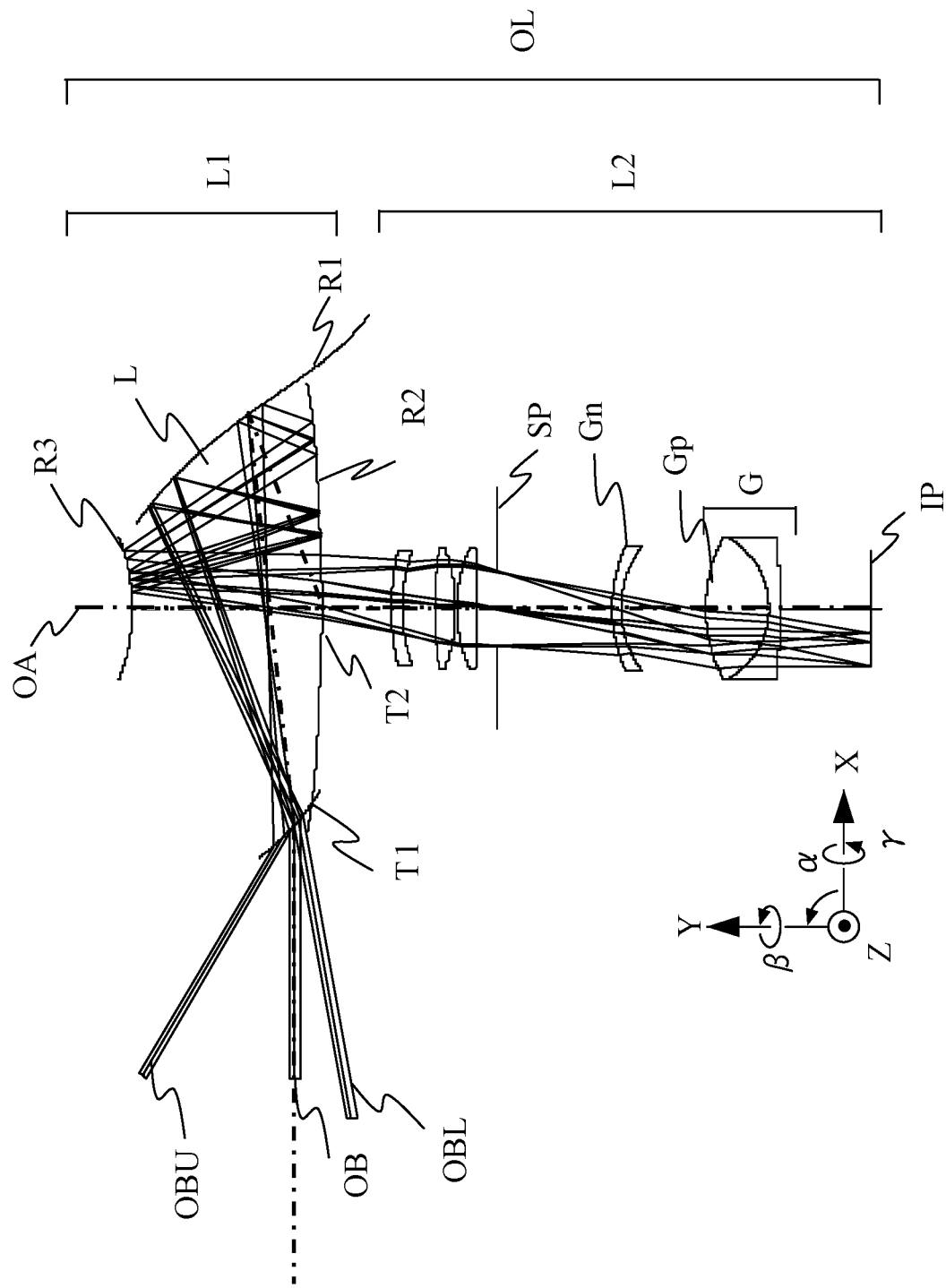
FIG. 11 is a sectional view taken along a line X-Y when an optical system according to Example 5 is in-focus at infinity.
Figure 12:
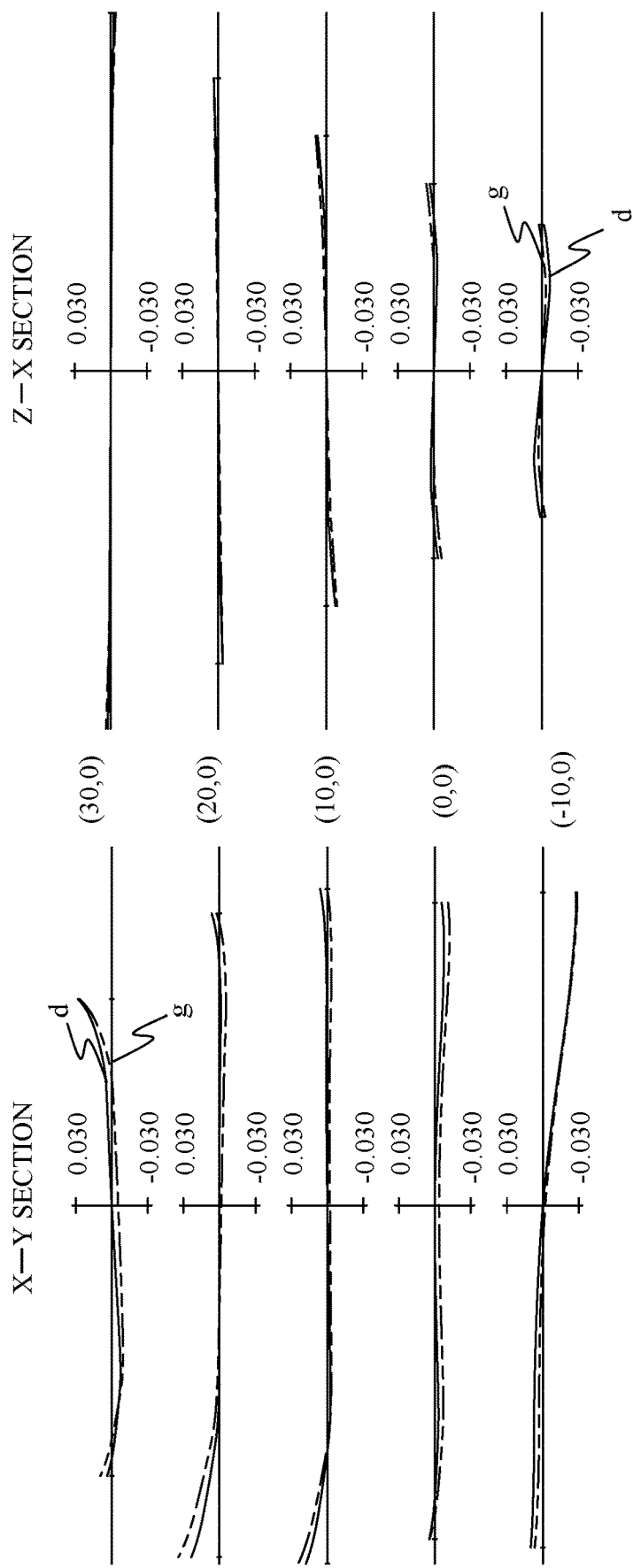
FIG. 12 is a lateral aberration diagram of the optical system according to Example 5 that is in-focus at infinity.

FIG. 11 is a sectional view taken along the line X-Y when the optical system OL according to this example is in-focus at infinity. FIG. 12 is a lateral aberration diagram of the optical system OL according to this example that is in-focus at infinity. In the lateral aberration diagram, central numerical values indicate an angle of the incident light ray on the entrance unit T1 in the X-Y section and an angle of the incident light ray on the entrance unit T1 in the Z-X section. The angle of the light ray incident on the entrance unit T1 in the X-Y section is an angle formed between the light ray incident on the entrance unit T1 in the X-Y section and the X axis. The angle of the light ray incident on the entrance unit T1 in the Z-X section is an angle formed between the light ray incident on the entrance unit T1 in the Z-X section and the X axis. Left and right graphs illustrate the lateral aberration at the angle of the incident ray. A solid line illustrates the lateral aberration for the d-line (wavelength 587.56 nm), and a dotted line illustrates the lateral aberration for the g-line (wavelength 435.8 nm).

The optical system OL includes, in order from the enlargement side to the reduction side, a front unit L1 and a rear unit L2, each of which is rotationally symmetric with respect to the central axis OA. The front unit L1 is rotationally symmetric around the central axis OA and includes a transparent medium L with a refractive index larger than 1. The transparent medium L includes, in order from the enlargement side to the reduction side, the entrance unit T1, the first reflective surface R1, the second reflective surface R2, the third reflective surface R3, and the exit unit T2. Each of the entrance unit T1 and the first reflective surface R1 has a free-form surface with the central axis OA as a reference axis. Each of the second reflective surface R2, the third reflective surface R3, and the exit unit T2 has an aspherical surface with the central axis OA as a reference axis. Each of the entrance unit T1 and the exit unit T2 has a refractive surface. The rear unit L2 has a diaphragm SP coaxial with the central axis OA. The rear unit L2 includes, on the image side of the diaphragm SP, a negative lens Gn having a concave surface facing the image side, and a cemented lens G including a positive lens Gp and a negative lens.

The incident light from the entrance unit T1 intersects the central axis OA and enters the first reflective surface RE The reflected light from the first reflective surface R1 enters the second reflective surface R2 without intersecting the central axis OA. The reflected light from the second reflective surface R2 enters the third reflective surface R3 without intersecting the central axis OA. The reflected light from the third reflective surface R3 is emitted from the exit unit T2.

The first reflective surface R1 is disposed on the image side of the third reflective surface R3. The second reflective surface R2 is disposed on the image side of the first reflective surface RE The entrance unit T1 is disposed between the first reflective surface R1 and the third reflective surface R3 in the X-Y section.

The light emitted from the exit unit T2 passes through the rear unit L2 and is imaged in an annular shape at a position deviated from the central axis OA of the image plane IP.

A light ray OBU incident on the entrance unit T1 from the side opposite to the image side of the principal ray OB is imaged outside a position where the principal ray OB is imaged on the image plane IP. A light ray OBL incident on the entrance unit T1 from the image side of the principal ray OB is imaged inside the position where the principal ray OB is imaged on the image plane IP.

The incident light from the entrance unit T1 forms an intermediate image once in the X-Y section. In the X-Y section, the principal ray OB forms an intermediate image once from the entrance unit T1 to the first reflective surface R1.

The optical system OL according to each example has an entrance pupil between the entrance unit T1 and the first reflective surface R1 in the X-Y section.

In the optical system OL according to each example, the distortion and the like may be electronically corrected. The optical system OL according to each example may have an optical element such as a low-pass filter and an IR cut filter in front of the image plane IP, if necessary. The optical system OL according to each example may have a diffractive optical element.

In the optical system OL according to each example, a part of the rear unit L2 may be a focus unit that moves in the Y-axis direction during focusing from an infinity object to a short-distance object. The optical system OL according to each example may be used for a focus unit.

The optical system OL according to each example may be used in a projection apparatus in which a liquid crystal, a transmission type liquid crystal, or the like is disposed on the image plane IP, a light source is disposed on the reduction side, and an image is projected on the enlargement side. In this case, the optical system OL according to each example includes, in order from the reduction side to the enlargement side, the entrance unit, the first reflective surface, the second reflective surface, the third reflective surface, and the exit unit. The exit unit is rotationally symmetric around the central axis OA. The reflected light from the first reflective surface enters the second reflective surface. The reflected light from the second reflective surface enters the third reflective surface without intersecting the central axis OA. The reflected light from the third reflective surface intersects the central axis OA and enters the exit unit.

Numerical examples 1 to 5 corresponding to Examples 1 to 5 will be shown below.

In the surface data in each numerical example, r represents a radius of curvature of each optical surface, and d (mm) represents an axial distance (distance on the optical axis) between an m-th surface and a (m+1)-th surface, where m is a surface number counted from the light incident side. Nd represents a refractive index of each optical element for the d-line, and vd represents an Abbe number of the optical element. The Abbe number vd of a certain material is defined as follows:

$$vd=(Nd-1)/(NF-NC)$$

where Nd, NF, and NC are refractive indexes for the d-line (587.6 nm), F-line (486.1 nm), and C-line (656.3 nm) in the Fraunhofer line.

The eccentricity is an eccentricity amount from the origin O. X, Y, and Z are eccentric amounts in the X-axis, Y-axis, and Z-axis directions, respectively. α and β are slopes centered on the X axis and the Y axis, respectively, and the counterclockwise rotation is set to be positive with respect to the positive direction of each axis.

If the optical surface is an aspherical surface, a * sign is attached to the right side of the surface number. The aspherical shape is expressed as follows:

$$X=(Y^2/R)/[1+\{1-(1+K)(Y/R)^2\}^{1/2}]+A4Y^4 \pm A6Y^6 \pm A8Y^8 + A10Y^{10} + A12Y^{12}$$

where the X axis is set to the axis, the Y axis is set to the direction orthogonal to the X axis, the light traveling direction is set to be positive, R is a paraxial radius of curvature, K is a conical constant, and A4 to A12 are aspherical coefficients of each order. "e±XX" in each aspherical coefficient means "$\times 10^{\pm XX}$."

The free-form surface is a rotationally symmetric aspherical surface given by the following definition. The following curve is determined by passing through the origin on the X-Y coordinate plane.

$$X=(Y^2/RY)/[1+\{1-(C1+1)Y^2/RY^2\}^{1/2}]+C2Y+C3Y^2+C4Y_3+C5Y^4$$

A curve F(Y) is defined by rotating the above curve by an angle θ (°) where the positive direction is set to be counterclockwise while the positive direction of the Z axis is viewed. This curve F(Y) also passes through the origin in the X-Z coordinate system.

A rotationally symmetrical plane is set to a free-form surface which is made by translating the curve F(Y) in the positive direction of the X axis (in the negative direction of the Z axis when it is negative) by the distance R, and then by rotating the translated curve around the Y axis.

From this definition, the Y axis is the axis of the free-form surface. RY is a radius of curvature of a spherical term in the X-Y section, C1 is a conical constant, and C2 to C5 are aspherical coefficients. "e-x" means $10^{-x}$. REF is a reflective surface and RFS is a free-form surface.

Numerical Example 1

HORIZONTAL ANGLE OF VIEW 360°
PERPENDICULAR ANGLE OF VIEW 40° (−10°~+30°)
IMAGE CIRCLE φ6.00-φ13.90 mm

UNIT: mm

Surface Data

| Surface No. | r | d | nd | vd | Effective Diameter | Eccentricity |
|---|---|---|---|---|---|---|
| 1 RFS[1] | | 0.00 | 1.48749 | 70.2 | 4.50 | Eccentricity[1] |
| 2 RFS[2] (REF) | | 0.00 | 1.48749 | 70.2 | 36.00 | Eccentricity[2] |
| 3* (REF) | −102.502 | 0.00 | 1.48749 | 70.2 | 53.00 | Eccentricity[3] |
| 4* (REF) | −20.993 | 0.00 | 1.48749 | 70.2 | 16.00 | Eccentricity[4] |
| 5* | −102.502 | 0.00 | | | 53.00 | Eccentricity[5] |
| 6 | 31.579 | 1.20 | 1.84666 | 23.8 | 13.00 | Eccentricity[6] |
| 7 | 19.422 | 3.82 | | | 13.00 | α −90.00 |
| 8 | 36.258 | 2.43 | 1.49700 | 81.5 | 13.50 | α −90.00 |
| 9 | −25.884 | 0.30 | | | 13.50 | α −90.00 |
| 10 | 19.127 | 2.09 | 1.49700 | 81.5 | 13.50 | α −90.00 |
| 11 | 2822.521 | 2.50 | | | 13.50 | α −90.00 |
| 12(Diaphragm) | ∞ | 17.02 | | | 9.00 | α −90.00 |
| 13 | 17.345 | 1.20 | 1.56732 | 42.8 | 14.00 | α −90.00 |
| 14 | 12.584 | 7.13 | | | 14.00 | |
| 15 | 17.219 | 7.77 | 1.72916 | 54.7 | 16.20 | α −90.00 |
| 16 | −10.119 | 1.20 | 1.95375 | 32.3 | 16.20 | α −90.00 |
| 17 | −75.045 | 10.99 | | | 16.20 | α −90.00 |
| Image Plane | ∞ | | | | | |

ASPHERIC DATA

3rd Surface

K = 0.00000e+000 A 4 = 1.45617e−005 A 6 = −3.33862e−008
A 8 = 3.35656e−011 A10 = −1.38566e−014

4th Surface

K = 0.00000e+000 A 4 = 1.22569e−004 A 6 = −1.95186e−006
A 8 = 6.70564e−009 A10 = 1.80481e−011

5th Surface

K = 0.00000e+000 A 4 = 1.45617e−005 A 6 =−3.33862e−008
A 8 = 3.35656e−011 A10 = −1.38566e−014

RFS[1]

| RY | inf |
|---|---|
| θ | −133.423 |
| R | −27.408 |
| C3 | −2.077e−002 |
| C4 | 8.284e−004 |
| C5 | −2.832e−005 |

RFS[2]

| RY | −792.060 |
|---|---|
| θ | −142.876 |
| R | 24.022 |
| C3 | 4.502e−003 |
| C4 | −3.226e−004 |
| C5 | −7.197e−006 |

Eccentricity[1]

X −27.408 Y 0.000 Z 0.000
α −133.423 β 0.000

Eccentricity[2]

X 24.022 Y 5.481 Z 0.000
α −142.876 β 0.000

Eccentricity[3]

X 0.000 Y −3.540 Z 0.000
α −90.00 β 0.000

-continued

UNIT: mm

Eccentricity[4]

X 0.000 Y 19.083 Z 0.000
α −90.00 β 0.000

Eccentricity[5]

X 0.000 Y −3.540 Z 0.000
α −90.00 β 0.000

Eccentricity [6]

X 0.000 Y −10.97 8 Z 0.000
α −90.00 β 0.000

Numerical Example 2

HORIZONTAL ANGLE OF VIEW 360°
PERPENDICULAR ANGLE OF VIEW 50° (−20°~+30°)
IMAGE CIRCLE φ1.20-φ4.16 mm

UNIT: mm

Surface Data

| Surface No. | r | d | nd | vd | Effective Diameter | Eccentricity |
|---|---|---|---|---|---|---|
| 1 RFS[1] |  | 0.00 | 1.53110 | 55.9 | 1.00 | Eccentricity[1] |
| 2 RFS[2] |  | 0.00 | 1.53110 | 55.9 | 35.00 | Eccentricity[2](REF) |
| 3* | −3634.583 | 0.00 | 1.53110 | 55.9 | 22.00 | Eccentricity[3](REF) |
| 4* | −8.191 | 0.00 | 1.53110 | 55.9 | 6.00 | Eccentricity[4](REF) |
| 5* | −20.468 | 0.00 |  |  | 5.00 | Eccentricity[5] |
| 6 | −23.656 | 0.80 | 1.58144 | 40.8 | 8.00 | Eccentricity[6] |
| 7 | 23.687 | 1.04 |  |  | 8.00 | α −90.00 |
| 8 | −40.430 | 1.39 | 1.60311 | 60.6 | 8.00 | α −90.00 |
| 9 | −10.554 | 0.30 |  |  | 8.00 | α −90.00 |
| 10 | 22.665 | 1.73 | 1.49700 | 81.5 | 8.00 | α −90.00 |
| 11 | −14.278 | 2.50 |  |  | 8.00 | α −90.00 |
| 12(Diaphragm) | ∞ | 0.81 |  |  | 5.50 | α −90.00 |
| 13 | 28.333 | 0.80 | 1.65412 | 39.7 | 7.00 | α −90.00 |
| 14 | 12.493 | 1.11 |  |  | 7.00 | α −90.00 |
| 15 | 31.722 | 1.49 | 1.49700 | 81.5 | 7.00 | α −90.00 |
| 16 | −13.062 | 5.08 |  |  | 7.00 | α −90.00 |
| 17 | 16.006 | 2.88 | 1.49700 | 81.5 | 7.00 | α −90.00 |
| 18 | −13.836 | 0.80 | 2.00100 | 29.1 | 7.00 | α −90.00 |
| 19 | −140.754 | 9.50 |  |  | 7.00 | α −90.00 |
| Image Plane | ∞ |  |  |  |  |  |

ASPHERIC DATA

3rd Surface

K = 0.00000e+000 A 4 = −1.15724e−005 A 6 = −1.13873e−007
A 8 = 7.51518e−010 A10 = −1.42704e−012

4th Surface

K = 0.00000e+000 A 4 = 1.69216e−003 A 6 = −1.69884e−004
A 8 = 1.11932e−005 A10 = −3.31856e−007

5th Surface

K = 0.00000e+000 A 4 = 1.22797e−003 A 6 = −4.99107e−006
A 8 = 2.82782e−006 A10 = −1.37489e−007

UNIT: mm

RFS[1]

| RY | inf |
| θ | −134.874 |
| R | −13.177 |
| C3 | −4.902e−002 |
| C4 | 4.192e−003 |
| C5 | 5.294e−003 |

RFS[2]

| RY | 379.540 |
| θ | −146.135 |
| R | 15.531 |
| C3 | −2.790e−003 |
| C4 | −6.598e−004 |
| C5 | −5.451e−006 |

Eccentricity[1]

X −13.177 Y 0.000 Z 0.000
α −134.874 β 0.000

Eccentricity[2]

X 15.531 Y −2.465 Z 0.000
α −146.135 β 0.000

Eccentricity[3]

X 0.00 Y −2.116 Z 0.000
α −90.00 β 0.000

Eccentricity[4]

X 0.00 Y 10.955 Z 0.000
α −90.00 β 0.000

Eccentricity[5]

X 0.000 Y −2.113 Z 0.000
α −90.00 β 0.000

Eccentricity [6]

X 0.000 Y −10.894 Z 0.000
α −90.00 β 0.000

Numerical Example 3

HORIZONTAL ANGLE OF VIEW 360°
PERPENDICULAR ANGLE OF VIEW 25° (−20°~+5°)
IMAGE CIRCLE φ4.66-φ14.07 mm

UNIT: mm

Surface Data

| Surface No. | r | d | nd | vd | Effective Diameter | Eccentricity |
|---|---|---|---|---|---|---|
| 1 | ∞ | 0.00 |  |  | 5.00 | Eccentricity[1] |
| 2 RFS[1] |  | 0.00 |  |  | 70.00 | Eccentricity[2](REF) |
| 3* | −141.259 | 0.00 |  |  | 80.00 | Eccentricity[3](REF) |
| 4* | −58.031 | 0.00 |  |  | 30.00 | Eccentricity[4](REF) |
| 5 | ∞ | 12.44 |  |  | 35.00 | Eccentricity[5] |
| 6 | −90.798 | 1.10 | 1.76182 | 26.5 | 15.50 | α −90.00 |
| 7 | 19.429 | 6.26 |  |  | 15.50 | α −90.00 |
| 8 | 74.231 | 3.39 | 1.90043 | 37.4 | 15.50 | α −90.00 |
| 9 | −65.006 | 3.28 |  |  | 15.50 | α −90.00 |
| 10 | 23.684 | 2.77 | 1.65160 | 58.5 | 15.00 | α −90.00 |
| 11 | −81.742 | 2.50 |  |  | 15.00 | α −90.00 |
| 12(Diaphragm) | ∞ | 4.47 |  |  | 10.00 | α −90.00 |

-continued

UNIT: mm

| | | | | | | |
|---|---|---|---|---|---|---|
| 13 | 50.135 | 5.26 | 1.69680 | 55.5 | 14.00 | α −90.00 |
| 14 | −11.998 | 0.82 | 1.65412 | 39.7 | 14.00 | α −90.00 |
| 15 | −36.669 | 2.72 | | | 14.00 | α −90.00 |
| 16 | −15.940 | 0.82 | 1.72047 | 34.7 | 13.00 | α −90.00 |
| 17 | 72.595 | 14.84 | | | 13.00 | α −90.00 |
| 18 | 18.575 | 6.84 | 1.49700 | 81.5 | 16.00 | α −90.00 |
| 19 | −11.994 | 0.92 | 1.72916 | 54.7 | 16.00 | α −90.00 |
| 20 | −200.023 | 11.68 | | | 16.00 | α −90.00 |
| Image Plane | ∞ | | | | | |

ASPHERIC DATA

3rd Surface

K = 0.00000e+000 A 4 = 5.33612e−006 A 6 = −5.47699e−009
A 8 = 2.74757e−012 A10 = −5.19612e−016

4th Surface

K = 0.00000e+000 A 4 = 3.01240e−005 A 6 = −1.83656e−007
A 8 = 6.22968e−010 A10 = −8.34722e−013

RFS[1]

| | |
|---|---|
| RY | 124.666 |
| θ | −134.117 |
| R | 26.027 |
| C3 | 6.377e−004 |
| C4 | −1.637e−005 |
| C5 | 4.463e−007 |

Eccentricity[1]

X −42.242 Y 0.000 Z 0.000
α −180 β 0.000

Eccentricity[2]

X 26.027 Y 14.196 Z 0.000
α −134.117 β 0.000

Eccentricity[3]

X 0.000 Y −22.300 Z 0.000
α −90.00 β 0.000

Eccentricity[4]

X 0.000 Y 22.440 Z 0.000
α −90.00 β 0.000

Eccentricity[5]

X 0.000 Y −22.304 Z 0.000
α −90.00 β 0.000

Numerical Example 4

HORIZONTAL ANGLE OF VIEW 360°
PERPENDICULAR ANGLE OF VIEW 50° (−25°~+25°)
IMAGE CIRCLE φ4.85-φ13.91 mm

UNIT: mm

Surface Data

| Surface No. | r | d | nd | vd | Effective Diameter | Eccentricity |
|---|---|---|---|---|---|---|
| 1 RFS[1] | | 0.00 | 1.48749 | 70.2 | 4.50 | Eccentricity[1] |
| 2 RFS[2] | | 0.00 | 1.48749 | 70.2 | 75.00 | Eccentricity[2](REF) |
| 3 RFS[3] | | 0.00 | 1.48749 | 70.2 | 75.00 | Eccentricity[3](REF) |
| 4* | 528.536 | 0.00 | 1.48749 | 70.2 | 60.00 | Eccentricity[4](REF) |
| 5* | −64.882 | 0.00 | | | 25.00 | Eccentricity[5] |
| 6 | 28.899 | 2.00 | 1.84666 | 23.8 | 18.00 | α −90.00 |
| 7 | 11.000 | 7.76 | | | 18.00 | α −90.00 |
| 8 | 14.655 | 1.63 | 1.49700 | 81.5 | 16.00 | α −90.00 |
| 9 | 16.210 | 8.00 | | | 16.00 | α −90.00 |
| 10 | −33.941 | 4.32 | 1.65160 | 58.5 | 15.00 | α −90.00 |
| 11 | −11.944 | 1.00 | 1.51742 | 52.4 | 15.00 | α −90.00 |
| 12 | −18.709 | 10.88 | | | 15.00 | α −90.00 |
| 13(Diaphragm) | ∞ | 4.00 | | | 8.00 | α −90.00 |
| 14 | 30.070 | 1.50 | 1.62004 | 36.3 | 15.00 | α −90.00 |
| 15 | 16.207 | 2.61 | | | 15.00 | α −90.00 |
| 16 | 15.140 | 4.57 | 1.88300 | 40.8 | 16.00 | α −90.00 |
| 17 | 134.236 | 0.90 | 1.85883 | 30.0 | 16.00 | α −90.00 |
| 18 | 38.577 | 6.30 | | | 16.00 | α −90.00 |
| 19 | 14.947 | 7.62 | 1.61800 | 63.4 | 16.00 | α −90.00 |
| 20 | −11.285 | 0.92 | 2.00100 | 29.1 | 16.00 | α −90.00 |
| 21 | −1836.052 | 13.71 | | | 16.00 | α −90.00 |
| Image Plane | ∞ | | | | | |

ASPHERIC DATA

4th Surface

K = 0.00000e+000 A 4 = −5.13031e−006 A 6 = 1.30024e−008
A 8 = −1.96512e−011 A10 = 1.02836e−014

5th Surface

K = 0.00000e+000 A 4 = 1.83398e−005 A 6 = 8.27780e−008
A 8 = −1.21421e−009 A10 = 5.88596e−012

RFS[1]

| | |
|---|---|
| RY | inf |
| θ | −219.901 |
| R | −44.219 |
| C3 | −6.063e−003 |
| C4 | −4.633e−004 |
| C5 | 1.056e−004 |

RFS[2]

| | |
|---|---|
| RY | 166.287 |
| θ | −162.295 |
| R | 52.959 |
| C3 | −5.124e−005 |
| C4 | −2.954e−005 |
| C5 | −1.986e−007 |

RFS[3]

| | |
|---|---|
| RY | inf |
| θ | −99.030 |
| R | 47.222 |
| C3 | −3.647e−003 |
| C4 | −3.773e−005 |
| C5 | 2.586e−007 |

Eccentricity[1]

X −44.219 Y 0.000 Z 0.000
α −219.901 β 0.000

Eccentricity[2]

X 52.959 Y −26.164 Z 0.000
α −162.295 β 0.000

Eccentricity[3]

X 47.222 Y −61.893 Z 0.000
α −99.030 β 0.000

Eccentricity[4]

X 0.000 Y 2.344 Z 0.000
α −90.00 β 0.000

-continued

| UNIT: mm |
|---|
| Eccentricity[5] |
| X 0.000 Y −52.966 Z 0.000
α −90.00 β 0.000
Eccentricity[6] |
| X 0.00 Y −55.466 Z 0.000
α −90.00 β 0.000 |

Numerical Example 5

HORIZONTAL ANGLE OF VIEW 360°
PERPENDICULAR ANGLE OF VIEW 40° (−10°~+30°)
IMAGE CIRCLE φ6.11-φ13.87 mm

| UNIT: mm | | | | | |
|---|---|---|---|---|---|
| Surface Data | | | | | |
| Surface No. | r | d | nd | vd | Effective Diameter | Eccentricity |
| 1 RFS[1] | | 0.00 | 1.48749 | 70.2 | 10.00 | Eccentricity[1] |
| 2 RFS[2] | | 0.00 | 1.48749 | 70.2 | 36.00 | Eccentricity[2](REF) |
| 3* | −115.301 | 0.00 | 1.48749 | 70.2 | 53.00 | Eccentricity[3](REF) |
| 4* | −22.731 | 0.00 | 1.48749 | 70.2 | 16.00 | Eccentricity[4](REF) |
| 5* | −115.301 | 0.00 | | | 53.00 | Eccentricity[5] |
| 6 | 32.400 | 1.20 | 1.84666 | 23.8 | 13.00 | Eccentricity[6] |
| 7 | 19.566 | 3.82 | | | 13.00 | α −90.00 |
| 8 | 41.739 | 2.37 | 1.49700 | 81.5 | 13.50 | α −90.00 |
| 9 | −25.695 | 0.30 | | | 13.50 | α −90.00 |
| 10 | 18.668 | 2.27 | 1.49700 | 81.5 | 13.50 | α −90.00 |
| 11 | −201.663 | 2.52 | | | 13.50 | α −90.00 |
| 12(Diaphragm) | ∞ | 13.49 | | | 9.00 | α −90.00 |
| 13 | 18.753 | 1.20 | 1.51742 | 52.4 | 14.00 | α −90.00 |
| 14 | 12.843 | 9.85 | | | 14.00 | α −90.00 |
| 15 | 18.065 | 7.66 | 1.72916 | 54.7 | 16.20 | α −90.00 |
| 16 | −9.998 | 1.20 | 1.95375 | 32.3 | 16.20 | α −90.00 |
| 17 | −92.716 | 10.95 | | | 16.20 | α −90.00 |
| Image Plane | ∞ | | | | | |

ASPHERIC DATA

3rd Surface

K = 0.00000e+000 A 4 = 1.40033e−005 A 6 = −3.30094e−008
A 8 = 3.34433e−011 A10 = −1.37954e−014

4th Surface

K = 0.00000e+000 A 4 = 1.17735e−004 A 6 = −1.86758e−006
A 8 = 5.85584e−009 A10 = 3.27996e−011

5th Surface

K = 0.00000e+000 A 4 = 1.40033e−005 A 6 = −3.30094e−008
A 8 = 3.34433e−011 A10 = −1.37954e−014

| RFS[1] | |
|---|---|
| RY | inf |
| θ | −131.382 |
| R | −26.441 |
| C3 | −1.832e−002 |
| C4 | 3.941e−004 |
| C5 | −2.113e−005 |

| UNIT: mm | |
|---|---|
| RFS[2] | |
| RY | −752.602 |
| θ | −143.768 |
| R | 23.648 |
| C3 | 4.938e−003 |
| C4 | −3.204e−004 |
| C5 | −5.856e−006 |

| Eccentricity[1] |
|---|
| X −26.441 Y 0.000 Z 0.000
α −131.382 β 0.000 |
| Eccentricity[2] |
| X 23.648 Y 5.201 Z 0.000
α −143.768 β 0.000 |
| Eccentricity[3] |
| X 0.000 Y −3.521 Z 0.000
α −90.00 β 0.000 |
| Eccentricity[4] |
| X 0.000 Y 19.006 Z 0.000
α −90.00 β 0.000 |
| Eccentricity[5] |
| X 0.000 Y −3.521 Z 0.000
α −90.00 β 0.000 |
| Eccentricity[6] |
| X 0.00 Y −11.742 Z 0.000
α −90.00 β 0.000 |

TABLE 1

| | Ex. 1 | Ex. 2 | Ex. 3 | Ex. 4 | Ex. 5 |
|---|---|---|---|---|---|
| A | 46.098 | 22.653 | 80.661 | 99.851 | 44.504 |
| B | 17.401 | 9.317 | 21.766 | 41.913 | 17.693 |
| fx − y | −5.701 | −1.918 | −11.510 | −5.223 | −5.508 |
| fz − x | −4.004 | −1.229 | −5.855 | −4.264 | −4.003 |
| RP1 | 17.219 | 16.606 | 18.575 | 14.947 | 18.065 |
| RP2 | −10.119 | −13.835 | −11.994 | −11.285 | −9.998 |
| Dmax | 28.026 | 13.484 | 42.242 | 62.033 | 27.042 |
| D | 56.052 | 26.957 | 84.484 | 124.066 | 54.085 |
| Dr | 13.899 | 4.156 | 14.066 | 13.911 | 13.870 |
| B/A | 0.377 | 0.411 | 0.270 | 0.420 | 0.398 |
| |fx − y|/|fz − x| | 1.424 | 1.560 | 1.966 | 1.459 | 1.376 |
| (RP2 + RP1)/(PR2 − RP1) | −0.260 | −0.073 | −0.215 | −0.140 | −0.287 |
| D/Dr | 4.033 | 6.489 | 6.006 | 8.918 | 3.899 |

Each example can provide a compact optical system having a high image quality that can provide an omnidirectional image over 360°, an image pickup apparatus, and a projection apparatus each having the optical system.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-160429, filed on Sep. 25, 2020, which is hereby incorporated by reference herein in its entirety.

What is claimed is:
1. An optical system comprising:
an entrance unit, a first reflective surface, a second reflective surface, a third reflective surface, an exit unit, and a rear unit that is a dioptric optical system located on an image side of the exit unit, wherein the entrance unit is rotationally symmetric around a central axis, wherein incident light from the entrance unit intersects the central axis and enters the first reflective surface, wherein reflected light from the first reflective surface enters the second reflective surface without intersecting the central axis, wherein reflected light from the second reflective surface enters the third reflective surface, wherein the rear unit includes a diaphragm coaxial with the central axis, and a cemented lens located on the image side of the diaphragm, and wherein the following inequality is satisfied:

$$-0.90 < (RP2+RP1)/(RP2-RP1) \leq 0.00$$

where RP1 is a radius of curvature on an object side of a positive lens included in the cemented lens, and RP2 is a radius of curvature on an image side of the positive lens.

2. The optical system according to claim 1, wherein where a Y axis is set to the central axis and an X axis and a Z axis are set to a first axis and a second axis orthogonal to the central axis and orthogonal to each other, respectively, the second reflective surface is located on an image side of the first reflective surface in an X-Y section.

3. The optical system according to claim 1, wherein reflected light from the third reflective surface is emitted from the exit unit.

4. The optical system according to claim 1, wherein each of the first reflective surface, the second reflective surface, the third reflective surface, and the exit unit is rotationally symmetric around the central axis.

5. The optical system according to claim 1, wherein where a Y axis is set to the central axis and an X axis and a Z axis are set to a first axis and a second axis orthogonal to the central axis and orthogonal to each other, respectively, the second reflective surface is located on an image side of the third reflective surface in an X-Y section.

6. The optical system according to claim 1, wherein where a Y axis is set to the central axis and an X axis and a Z axis are set to a first axis and a second axis orthogonal to the central axis and orthogonal to each other, respectively, the reflected light from the second reflective surface enters the third reflective surface in an X-Y section without intersecting the central axis.

7. The optical system according to claim 1, wherein the following inequality is satisfied:

$$0.20 < B/A < 0.80$$

where A is a distance by which a reference axis ray travels from the entrance unit to the first reflective surface, and B is a distance by which the reference axis ray travels from the first reflective surface to the second reflective surface.

8. The optical system according to claim 1, wherein the incident light intersects the central axis twice from the entrance unit to an image plane.

9. The optical system according to claim 1, wherein where a Y axis is set to the central axis and an X axis and a Z axis are set to a first axis and a second axis orthogonal to the central axis and orthogonal to each other, respectively, the following inequality is satisfied:

$$1.05 < |f_{x-y}/f_{z-x}| < 10.00$$

where $f_{x-y}$ is a focal length of the optical system in an X-Y section and $f_{z-x}$ is a focal length of the optical system in an Z-X section.

10. The optical system according to claim 1, wherein the rear unit includes at least one single lens that has a negative refractive power with a concave surface facing an image side and is located on the image side of the diaphragm.

11. The optical system according to claim 1, wherein the following inequality is satisfied:

$$0.1 < D/Dr < 12.0$$

where D is a maximum diameter of the optical system, and Dr is a diameter of an image circle.

12. The optical system according to claim 1, wherein light incident on the entrance unit is imaged in an annular shape at a position deviated from the central axis of an image plane.

13. The optical system according to claim 1, wherein at least one of the entrance unit, the first reflective surface, the second reflective surface, the third reflective surface, and the exit unit has a free curved surface formed by rotating a line segment having an odd-order term around the central axis.

14. The optical system according to claim 1, wherein the entrance unit has a refractive power.

15. The optical system according to claim 1, wherein the exit unit has a refractive power.

16. An optical system comprising:
an entrance unit, a first reflective surface, a second reflective surface, a third reflective surface, an exit unit, and a rear unit that is a dioptric optical system located on an image side of the exit unit, wherein the exit unit is rotationally symmetric around a central axis, wherein reflected light from the first reflective surface enters the second reflective surface, wherein reflected light from the second reflective surface enters the third reflective surface without intersecting the central axis, wherein reflected light from the third reflective surface intersects the central axis and enters the exit unit, wherein the rear unit includes a diaphragm coaxial with the central axis, and a cemented lens located on the image side of the diaphragm, and wherein the following inequality is satisfied:

$$-0.90 < (RP2+RP1)/(RP2-RP1) \leq 0.00$$

where RP1 is a radius of curvature on an object side of a positive lens included in the cemented lens, and RP2 is a radius of curvature on an image side of the positive lens.

17. An apparatus comprising:
a system; and
a sensor configured to receive an image formed by the system, wherein the system includes:
an entrance unit, a first surface, a second surface, a third surface, an exit unit, and a rear unit that is a dioptric optical system located on an image side of the exit unit, wherein the entrance unit is rotationally symmetric around a central axis, wherein incident light from the entrance unit intersects the central axis and enters the first surface, wherein reflected light from the first surface enters the second surface without intersecting the central axis, wherein reflected light from the second surface enters the third surface, wherein the rear unit includes a diaphragm coaxial with the central axis, and a cemented lens located on the image side of the diaphragm, and wherein the following inequality is satisfied:

$$-0.90 < (RP2+RP1)/(RP2-RP1) \leq 0.00$$

where RP1 is a radius of curvature on an object side of a positive lens included in the cemented lens, and RP2 is a radius of curvature on an image side of the positive lens.

18. A projection apparatus comprising:
 a light source; and
 the optical system according to claim 17.

* * * * *